United States Patent
Kennema et al.

(10) Patent No.: US 12,146,434 B2
(45) Date of Patent: Nov. 19, 2024

(54) THREE-DIMENSIONAL POROUS CATALYST, CATALYST CARRIER OR ABSORBENT STRUCTURE OF STACKED STRANDS

(71) Applicant: BASF SE, Ludwigshafen am Rhein (DE)

(72) Inventors: Marco Oskar Kennema, Ludwigshafen am Rhein (DE); Bart Michielsen, Mol (BE); Jasper Lefevere, Mol (BE); Christian Walsdorff, Ludwigshafen am Rhein (DE); Fred Borninkhof, De Meern (NL); Florian Scharf, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 347 days.

(21) Appl. No.: 17/626,838

(22) PCT Filed: Jul. 16, 2020

(86) PCT No.: PCT/EP2020/070117
§ 371 (c)(1),
(2) Date: Jan. 13, 2022

(87) PCT Pub. No.: WO2021/013682
PCT Pub. Date: Jan. 28, 2021

(65) Prior Publication Data
US 2022/0314209 A1    Oct. 6, 2022

(30) Foreign Application Priority Data
Jul. 19, 2019    (EP) ...................................... 19187345

(51) Int. Cl.
*F01N 3/28*    (2006.01)
*B01J 20/28*    (2006.01)
(Continued)

(52) U.S. Cl.
CPC ...... *F01N 3/2803* (2013.01); *B01J 20/28042* (2013.01); *B01J 35/56* (2024.01);
(Continued)

(58) Field of Classification Search
CPC ...... B01J 20/28042; B01J 35/00; B01J 35/56; B01J 35/60; B01J 37/08; B01J 37/0018;
(Continued)

(56) References Cited

U.S. PATENT DOCUMENTS

| 6,027,326 A | 2/2000 | Cesarano et al. |
| 6,401,795 B1 | 6/2002 | Cesarano et al. |

(Continued)

FOREIGN PATENT DOCUMENTS

| CN | 109160800 A | 1/2019 |
| EP | 3381546 A1 | 10/2018 |
| WO | 2017/055565 A1 | 4/2017 |

OTHER PUBLICATIONS

International Search Report and Written Opinion received for PCT Patent Application No. PCT/EP2020/070117, mailed on Oct. 2, 2020, 8 pages.

(Continued)

*Primary Examiner* — Colin W. Slifka
(74) *Attorney, Agent, or Firm* — Faegre Drinker Biddle & Reath LLP

(57) ABSTRACT

A three-dimensional porous catalyst, catalyst carrier or absorbent structure of stacked strands of catalyst, catalyst carrier or absorbent material, composed of layers of spaced-apart parallel strands, wherein parallel strands within a layer are arranged in groups of two or more closely spaced-apart, equidistant strands separated by a small distance, wherein the groups of equidistant strands are separated from adjacent strands or adjacent groups of strands by a larger distance.

20 Claims, 14 Drawing Sheets

(51) Int. Cl.
| | |
|---|---|
| *B01J 35/56* | (2024.01) |
| *B01J 37/00* | (2006.01) |
| *B01J 37/16* | (2006.01) |
| *B22F 1/105* | (2022.01) |
| *B22F 5/10* | (2006.01) |
| *B22F 10/18* | (2021.01) |
| *B22F 10/64* | (2021.01) |
| *B22F 12/53* | (2021.01) |
| *B33Y 10/00* | (2015.01) |
| *B33Y 40/10* | (2020.01) |
| *B33Y 40/20* | (2020.01) |
| *B33Y 80/00* | (2015.01) |

(52) U.S. Cl.
CPC ............ *B01J 37/0018* (2013.01); *B01J 37/16* (2013.01); *B22F 1/105* (2022.01); *B22F 5/10* (2013.01); *B22F 10/64* (2021.01); *B22F 12/53* (2021.01); *B33Y 10/00* (2014.12); *B33Y 40/10* (2020.01); *B33Y 40/20* (2020.01); *B33Y 80/00* (2014.12); *B22F 10/18* (2021.01)

(58) Field of Classification Search
CPC ... B01J 37/16; B22F 1/105; B22F 5/10; B22F 10/18; B22F 10/64; B22F 12/53; B22F 2998/10; B22F 2999/00; B22F 3/115; B33Y 10/00; B33Y 70/00; B33Y 40/10; B33Y 40/20; B33Y 80/00; F01N 3/2803; F01N 2330/00; F01N 2330/04; F01N 2330/38; F01N 2330/30; Y02P 10/25
USPC ........... 502/65, 439, 527.14, 527.16, 527.17, 502/527.19, 527.2
See application file for complete search history.

(56) References Cited

U.S. PATENT DOCUMENTS

| | | |
|---|---|---|
| 6,993,406 B1 | 1/2006 | Cesarano et al. |
| 7,527,671 B1 | 5/2009 | Stuecker et al. |
| 8,119,554 B2 | 2/2012 | Kashani-Shirazi et al. |
| 9,597,837 B1 | 3/2017 | Cesarano et al. |
| 2011/0129640 A1 | 6/2011 | Beall et al. |
| 2020/0101435 A1* | 4/2020 | Protasova ................. C10L 3/08 |
| 2022/0072524 A1* | 3/2022 | Walsdorff ................ B01J 37/08 |

OTHER PUBLICATIONS

Danaci et al., "Efficient CO2 Methanation over Ni/Al2O3 Coated Structured Catalysts," Catalysis Today, vol. 273, 2016, pp. 234-243.
International Preliminary Report on Patentability received for PCT Patent Application No. PCT/EP2020/070117, mailed on Feb. 3, 2022, 7 pages.
Tubio et al., "3D printing of a heterogeneous copper-based catalyst", Journal of Catalysis, vol. 334, 2016, pp. 110-115.

* cited by examiner

THREE-DIMENSIONAL POROUS CATALYST, CATALYST CARRIER OR ABSORBENT STRUCTURE OF STACKED STRANDS

CROSS-REFERENCE TO RELATED APPLICATIONS

This application is a national stage application (under 35 U.S.C. § 371) of PCT/EP2020/070117, filed Jul. 16, 2020, which claims benefit of European Application No. 19187345.4, filed Jul. 19, 2019, both of which are incorporated herein by reference in their entirety.

The invention relates to a three-dimensional porous catalyst, catalyst support or absorbent structure of stacked strands, a method for producing the three dimensional structure and the use of the three dimensional structure.

Typically, inorganic catalysts, catalyst supports or absorbents are produced as extruded strands or extruded monolith or honeycomb structures.

Alternative processes which allow for a greater variety of shapes in comparison to a linear stretched honeycomb structure can be prepared e.g. by rapid prototyping processes. The process described in U.S. Pat. No. 8,119,554, for example, involves the production of a shaped body by means of a powder-based rapid prototyping process, in which a binder material is selectively introduced in an inorganic catalyst powder to form the three-dimensional structure.

A further production process often named robocasting can be employed. In this method, a paste of the catalyst material particles is extruded into strands which are deposited in stacked layers to form the desired three-dimensional structure. Subsequently, the structure is dried and sintered. The production of regenerable diesel soot particulate filters by robocasting methods is disclosed in U.S. Pat. No. 7,527,671.

This method has also been employed for preparing $Cu/Al_2O_3$ catalytic systems with a wood pile porous structure. Journal of Catalysis 334 (2016), 110 to 115, relates to the 3D printing of a heterogeneous copper-based catalyst. $Al_2O_3$ powder with a mean particle size of 0.5 μm was added to an aqueous solution of copper(II) nitrate, and the viscosity of the resulting suspension was adjusted by adding hydroxypropyl methyl cellulose as viscosity modifier. The resulting ink was concentrated by the removal of water by evaporation until suitable for extrusion. The aqueous ink was loaded into a syringe attached by a nozzle with a diameter of 410 μm. A robotic deposition system was used to create the woodpile structures. The structure was dried at room temperature for 24 h and subsequently sintered at 1400° C. for 2 h in air.

$Ni/Al_2O_3$-coated structured catalysts are disclosed in Catalysis Today, 273 (2016), pages 234 to 243. To prepare the catalyst, stainless steel supports were prepared using the robocasting process. The resulting 3D structures were sintered at 1300° C. for 4 h and a coating slurry of boehmite powder with nickel loading was applied. Thus, only the stainless steel support structure was prepared by robocasting.

All the above-mentioned processes need a sintering step at temperatures well above 1000° C.

For a number of catalysts employing catalytically active metals, such sintering at high temperatures is detrimental to the catalyst properties. Typically, the dispersion of the catalytically active metal on a catalyst support deteriorates upon this temperature treatment.

To obtain high external surface areas for the catalysts, e.g. for diffusion limited reactions, or high packing fractions with low void volume, in fixed-bed catalyst reactors, the use of smaller catalyst extrudates is necessary. In mass transfer limited reactions the performance of small catalyst extrudates is better than that of larger extrudates, especially in mass-transfer limited reactions. A disadvantage, however, is that smaller extrudates show a higher pressure drop in the packed bed. Furthermore, the mechanical strength of these small extrudates is typically not sufficient to form a packed bed reactor.

WO 2017/055565 A1 discloses a method of building a bulk catalytic structure, comprising: shaping a composition comprising a ceramic material to obtain a green structure, wherein said ceramic material comprises a catalytic material and a first and a second inorganic binder; firing the green structure to obtain the bulk catalytic structure, wherein the structure comprises first channels having a length extending in a flow direction and second channels having a length extending in a radial direction, wherein the shaping step comprises extruding the suspension, slurry or paste as fibers by three-dimensional fiber deposition, wherein the fibers form a layered network.

The layered network comprises alternating layers of fibers parallel to one another, wherein the fibers in successive layers are arranged orthogonal or oblique to one another.

U.S. Pat. No. 9,597,837 B1 discloses a method for making a three-dimensional porous fluidic device comprising: depositing struts and walls in the three-dimensional geometry using a rapid-prototyping method to construct a three-dimensional porous fluidic device, the three-dimensional porous fluidic device comprising: a fluidic inlet side and an outlet side; a wall surrounding the fluidic device; within the wall of the fluidic device a lattice of a plurality of struts positioned in layers forming a network of pores wherein the struts in the first layer are separated from the struts in a third layer by struts in a second layer which are arranged at an angle to the struts in the first layer and the third layer and wherein the struts in the third layer and the first layer are offset in spacing and wherein the struts within a layer are separated from an adjacent strut within the layer by a space such that channels having a tortuous pathway of interconnecting pores is formed.

EP 3 381 546 A1 discloses a device for through-flow of a fluid, comprising a fluid inlet and a fluid outlet, wherein the fluid inlet and the fluid outlet define an overall flow direction, a porous structure with interconnected pores arranged between the fluid inlet and the fluid outlet, wherein the porous structure is coupled to a wall to provide for heat conduction between the porous structure and the wall, and wherein the porous structure comprises a porosity gradient along a first direction which is cross to the overall flow direction, and wherein the porosity gradient develops along the first direction between a first porosity at a first location proximal to the wall and a second porosity larger than the first porosity at a second location remote from the wall. The porous structure comprises an arrangement of fibers which are attached to one another, wherein the fibers are arranged in parallel layers, the layers being stacked.

Current catalysts prepared through robocasting have a large surface area. However, they also have a high pressure drop across the individual monolith bodies, which in turn results in a high pressure drop across a reactor where these monolith bodies would be placed. Alternatively, a bed of randomly packed monoliths may have a low pressure drop in a reactor, but the entrance barrier into the monoliths due to the pressure drop across each individual monolith body would lead to channeling of the gas flow through the reactor, and the improvement in the geometric surface area provided by the robocasting technique would not be fully utilized.

The object underlying the present invention is to provide a catalyst including a catalytically active metal which has a high external surface area or high packing fraction. The catalyst structure should be sufficiently mechanically stable so that packed catalyst beds can be formed in a reactor. In particular, the catalyst structure should give a low pressure drop in a structured or in a randomly packed bed of catalyst monolith bodies without the tendency to channeling.

The object is achieved by a three-dimensional porous catalyst, catalyst carrier or absorbent structure of stacked strands of catalyst, catalyst carrier or absorbent material, composed of layers of spaced-apart parallel strands, wherein parallel strands within a layer are arranged in groups of two or more closely spaced-apart, equidistant strands separated by a small distance, wherein the groups of equidistant strands are separated from adjacent strands or adjacent groups of strands by a larger distance.

Current state of the art monolith structures have parallel channels parallel to the primary direction of flow within the monolith structure and thus have no cross-channel flow pattern. The inventive catalyst shape allows for multiple flow directions of the gas through the three dimensional structure with a preferential path, but also secondary and tertiary cross-channel flows through the structure. In the case of the inventive three dimensional structure, a zig-zag primary flow pattern through the three dimensional structure provides a significantly lower pressure-drop, a higher turbulent flow with a minimal decrease in surface area per volume.

The current state of the art additive manufactured catalysts prepared using the layer by layer addition of fibers allow for cross-channel flow of gas, however the primary direction of flow of the gas is in the direction perpendicular to the deposition of the strands of the layer. In some cases, the fibers are laid in such a way as to allow for a primary flow in a zig-zag pattern across the monolith, this zig-zag pattern being known to improve the activity of the catalyst in comparison to the straight-channeled state of the art catalyst. The pressure-drop and turbulence of these state of the art three dimensional structures is very much limited by the fact that only equidistant fiber deposition patterns are used to construct this three dimensional structure.

The inventive structure geometry can be used to further build on the fact that the zig-zag flow pattern through the three dimensional structure increases the catalytic activity by providing a high degree of turbulence in the three dimensional structure while providing a decrease in the pressure drop across the structure when compared to the state of the art manufactured catalyst prepared by layer fiber addition.

The three dimensional structures of the invention are in general used as catalyst, catalyst carrier or absorbent monoliths or smaller catalyst, catalyst carrier or absorbent shaped bodies. While the former are in general used in structured packings of a reactor, the latter are in general used in randomly packed catalyst beds.

In preferred embodiments, adjacent layers have the same pattern of parallel strands and are oriented at an angel to one another.

In one preferred embodiment, the three dimensional structure has a hexagonal cross-section and is composed of layers of parallel strands that are oriented at 0°, 60° and 120°, respectively, to one another. In a particular preferred embodiment, every third layer has the same orientation.

In a further preferred embodiment, the three dimensional structure has an octagonal cross-section and is composed of layers of parallel strands that are oriented at 0°, 45° and 90 and 135°, respectively, to one another. In a particular preferred embodiment, every forth layer has the same orientation.

In further preferred embodiments, the three dimensional structure comprises sections each composed of layers of spaced-apart parallel strands, wherein the pattern of the spaced apart parallel strands within layers of one section are different from the pattern of spaced apart parallel strands within layers of another section. A pattern is the arrangement of the parallel strands within a layer.

In one embodiment, each section is composed of 3 consecutive layers of the same pattern that are oriented at 0°, 60° and 120°, respectively, to one another in the case of a three dimensional structure having a hexagonal cross-section. In another embodiment, each section is composed of four consecutive layers of the same pattern that are oriented at 0°, 45° and 90 and 135°, respectively, to one another in the case of a three dimensional structure having an octagonal cross-section.

In further embodiments, the three dimensional structure comprises adjacent layers having different patterns of parallel strands. In some embodiments, the thickness of the parallel strands may vary in adjacent layers.

In general, the larger (secondary) distance is 2 to 10 times the small (primary) distance.

In a layer, some adjacent groups of closely spaced-apart parallel strands (separated by the primary distance) may be separated by a larger secondary distance (larger than the primary distance) and some other adjacent groups of closely spaced-apart groups of parallel strands may be separated by a still larger tertiary distance. The tertiary distance may be 1.5 to 3 times the secondary distance.

Preferably, the groups of parallel strands are each composed of two, three or four to six closely spaced-apart, equidistant strands.

In further preferred embodiments, single strands are arranged between two groups of closely spaced-apart parallel strands in a layer. In further preferred embodiments, pairs of strands are arranged between two groups of closely spaced-apart parallel strands in a layer.

In preferred embodiments, the small (primary) distance is from 0.5 to 2 mm and the larger (secondary) distance is from 2 to 10 mm.

The invention is further illustrated by the Figures.

FIG. 1 shows a schematic representation of an exemplary layer pattern of parallel spaced apart strands according to the invention wherein (a) designates the first group of equidistant parallel spaced apart strands and (c) designates the second group of equidistant parallel spaced apart strands. m1 designates the primary distance between parallel spaced apart strands in the first group of strands and m2 designates the secondary distance between groups of equidistant parallel spaced apart strands. For example, the strand diameter b=1 mm, m1=2 mm and m2=5 mm.

FIG. 2 schematically shows a top view of a three dimensional structure according to the invention using the layer pattern shown in FIG. 1.

Figure 1:
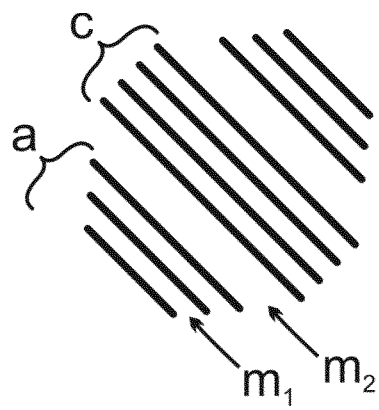
Figure 2:
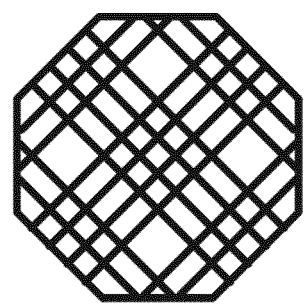
Figure 3:
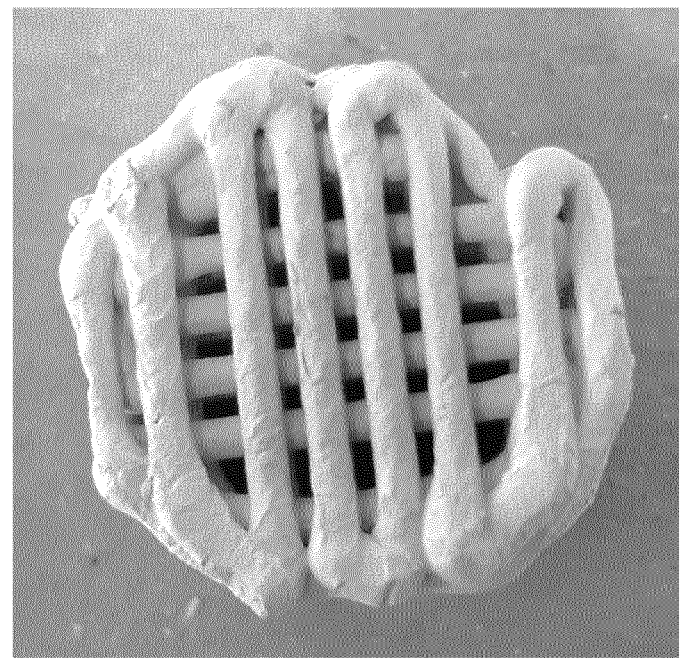
FIG. 3 shows a top view of an actual three dimensional structure according to the invention having lateral groups of two spaced apart strands and a central group of four spaced apart strands. The strand diameter b=1.6 mm, m1=1 mm and m2=2 mm.
Figure 4:
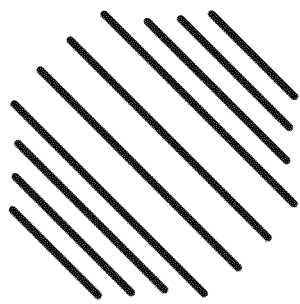
FIG. 4 shows a schematic representation of a further exemplary layer pattern of parallel spaced apart strands according to the invention having lateral groups of four parallel strands spaced apart by a primary distance and separated by a secondary distance from two central strands spaced apart by that secondary distance. For example, b=1 mm, m1=2, m2=4
Figure 5:
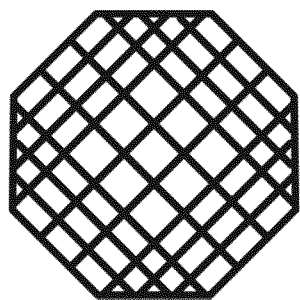

FIG. 5 schematically shows a top view of a three dimensional structure according to the invention using the layer pattern shown in FIG. 4.

Figure 6:
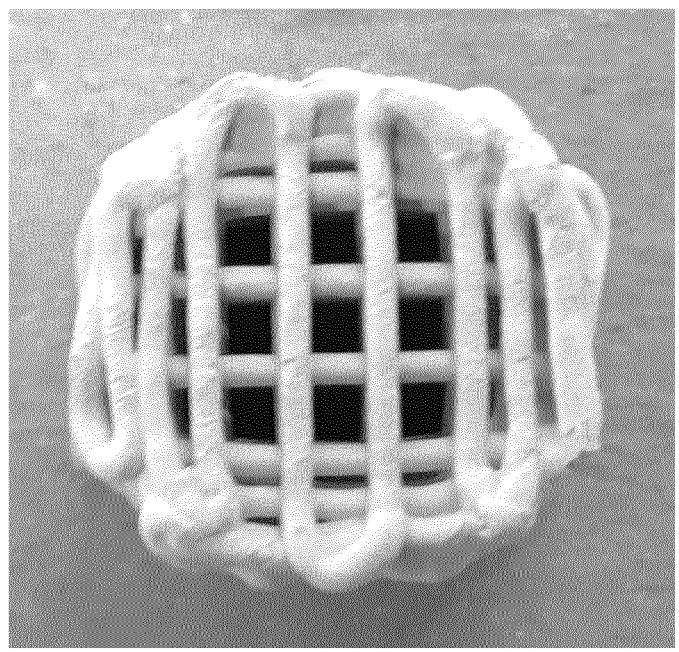

FIG. 6 shows a top view of an actual three dimensional structure according to the invention having the layer pattern shown in FIG. 4. For example, the strand diameter b=1.2 mm, m1=0.5 mm and m2=2 mm.

Figure 7:
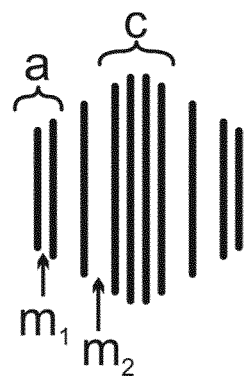

FIG. 7 shows the schematic representation of a further layer pattern of parallel spaced-apart strands according to the invention having (a) two lateral groups of each two closely spaced-apart parallel strands, spaced apart by m1, and (c) a central group of closely spaced-apart parallel strands, spaced apart by m1. The groups (a) and (c) are spaced apart from a single strand by m2. For example, b=1 mm, m1=1 mm and m2=3 mm.

Figure 8:
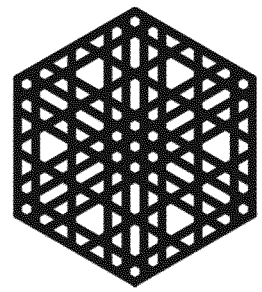

FIG. 8 schematically shows a top view of a three dimensional structure according the invention using the layer pattern described in FIG. 7.

Figure 9:
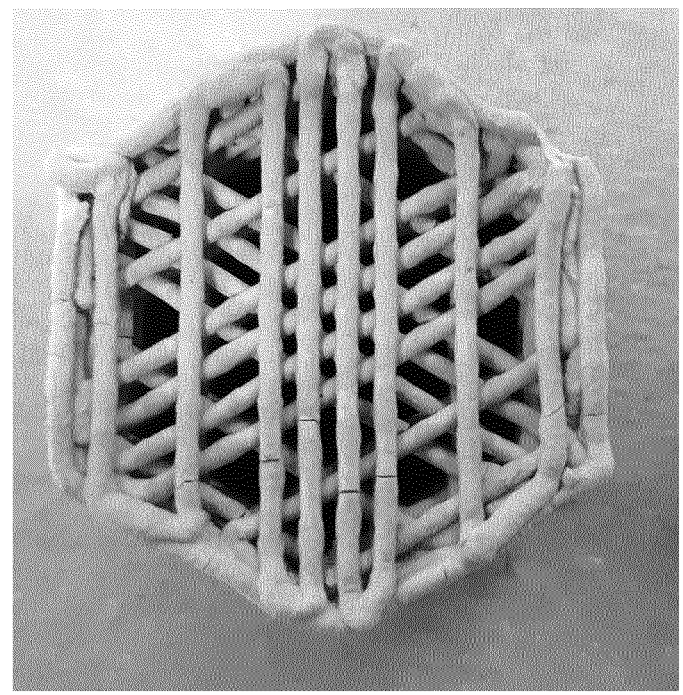

FIG. 9 shows a top view of an actual three dimensional structure of the invention using the layer pattern shown in FIG. 7. b=1.2 mm, m1=1 mm and m2=5 mm.

Figure 10:
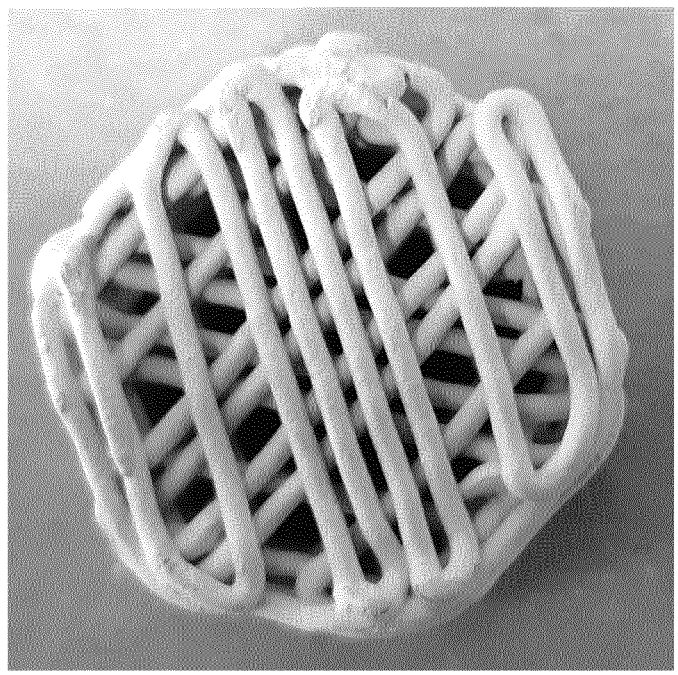

FIG. 10 schematically shows a top view of a further example of an actual three dimensional structure of the invention using the layer pattern shown in FIG. 7. b=1.6 mm, m1=0.5 mm and m2=2.5 mm.

Figure 11:
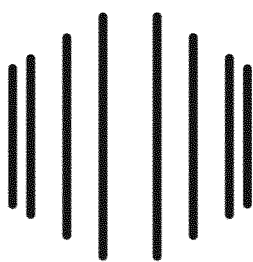

FIG. 11 shows a schematic representation of a further layer pattern of parallel spaced-apart strands according to the invention composed of pairs of spaced apart parallel strands, a first (outer) group of pairs being spaced-apart by a smaller (primary) distance (m1) and a second (inner) group of pairs being spaced-apart by a larger (secondary) distance (m2). The inner group of pairs is spaced-apart by still larger (tertiary) distance (m3). For example, b=1 mm, m1=1 mm, m2=3 mm and m3=5 mm.

Figure 12:
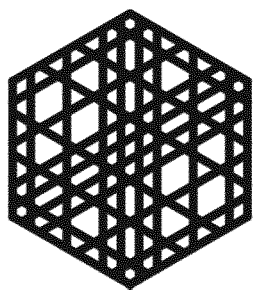

FIG. 12 schematically shows a top view of a three dimensional structure according to the invention using the layer pattern shown in FIG. 7, wherein every third layer has a layer pattern shown in FIG. 11.

Figure 13:
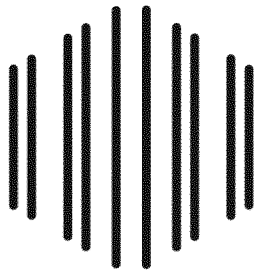

FIG. 13 shows a schematic representation of a further layer pattern of parallel spaced apart strands according to the invention. For example, b=1 mm, m1=1 mm, m2=3 mm and m3=2.5 mm.

Figure 14:
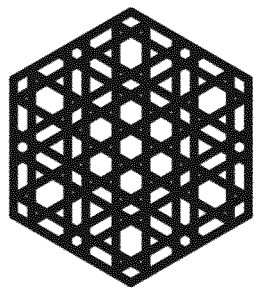

FIG. 14 shows a top view of a monolith according to the invention using the layer pattern shown in FIG. 13.

Figure 15:
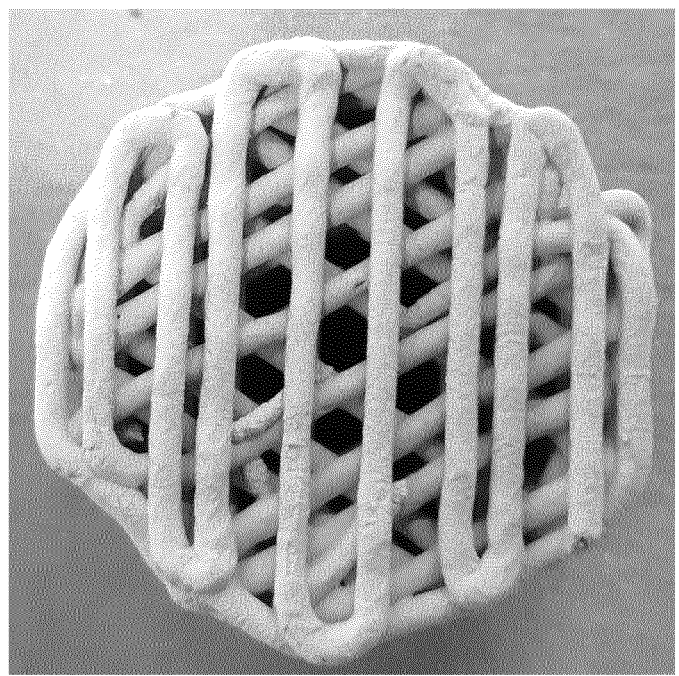

FIG. 15 shows a top view of an actual three dimensional structure according to the invention using the layer pattern shown in FIG. 13. b=1.6 mm, m1=0.5 mm and m2=2.5 mm.

Figure 16:
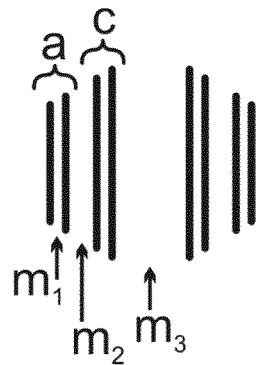

FIG. 16 shows a schematic representation of a further example of a layer pattern of parallel spaced-apart strands according to the invention wherein (a), (c) designate groups of two equidistant parallel spaced-apart strands. m1 designates the primary distance between parallel spaced-apart strands in each group of strands. m2 designates the larger secondary distance between the inner and the outer groups of parallel strands and m3 designates a still larger tertiary distance between the two inner groups of parallel strands. For example, b=1 mm, m1=1 mm, m2=3 mm, m3=8 mm.

Figure 17:
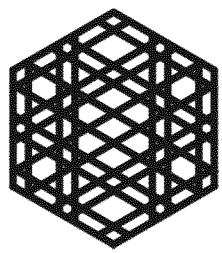

FIG. 17 schematically shows a top view of a three dimensional structure according to the invention using the layer pattern shown in FIG. 13 wherein every third layer has the layer pattern shown in FIG. 16.

Figure 18:
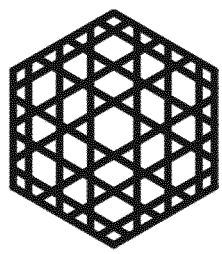

FIG. 18 schematically shows a top view of a three dimensional structure according to the invention using the layer pattern shown in FIG. 11.

Figure 19:
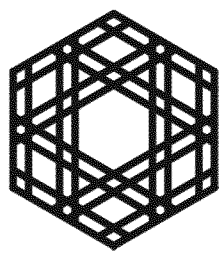

FIG. 19 schematically shows a top view of a three dimensional structure according to the invention using the layer pattern shown in FIG. 16.

Figure 20:
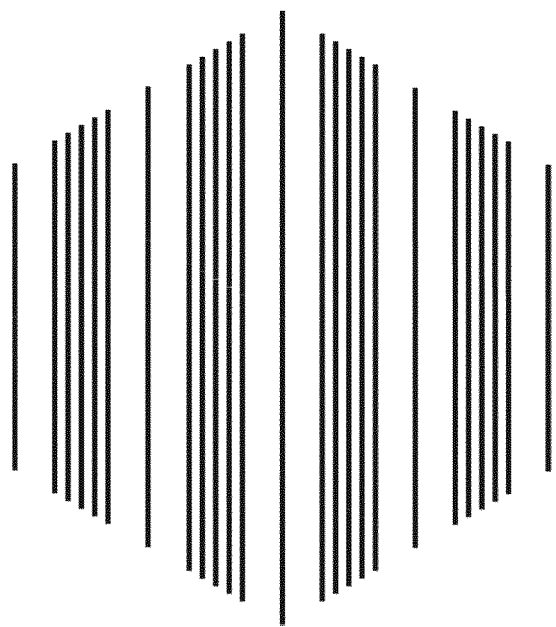

FIG. 20 shows a schematic representation of a further layer pattern of spaced-apart strands according to the invention having four groups of five equidistant closely spaced apart parallel strands separated by single strands.

Figure 21:
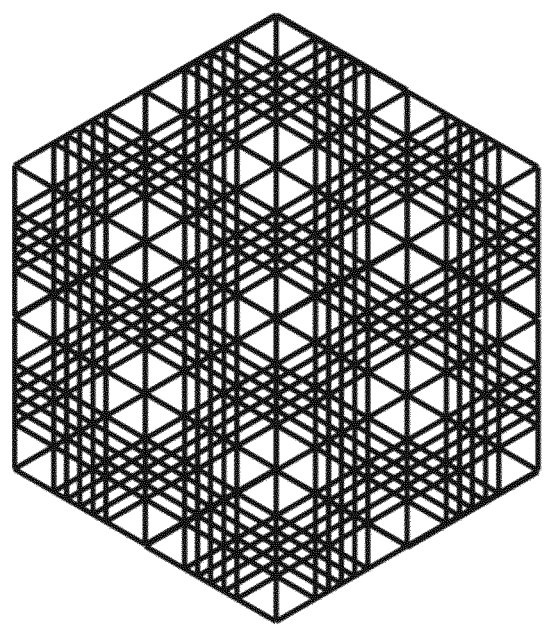

FIG. 21 schematically shows a top view of a three dimensional structure according to the invention using the layer pattern shown in FIG. 20.

Figure 22:
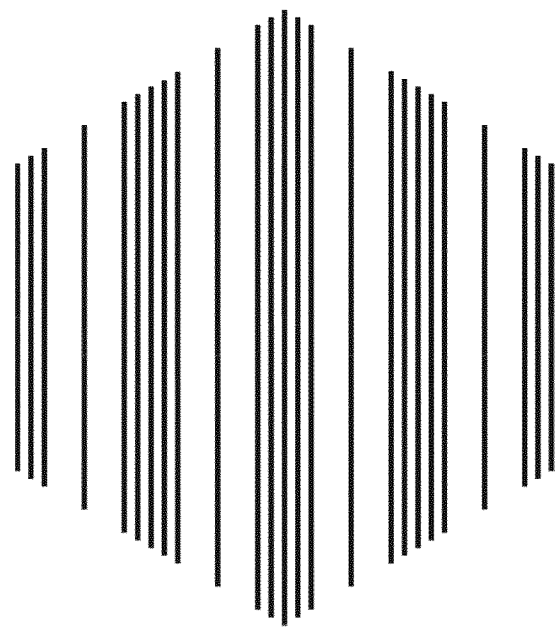

FIG. 22 schematically shows a schematic representation of a further layer pattern of spaced apart strands according to the invention having groups of three and groups of five equidistant closely spaced apart parallel strands separated by single strands.

Figure 23:
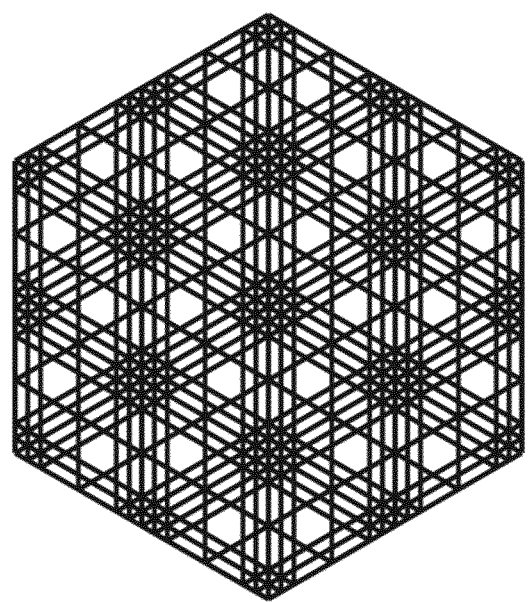

FIG. 23 schematically shows a top view of a three dimensional structure according to the invention using the layer pattern shown in FIG. 22.

Figure 24:
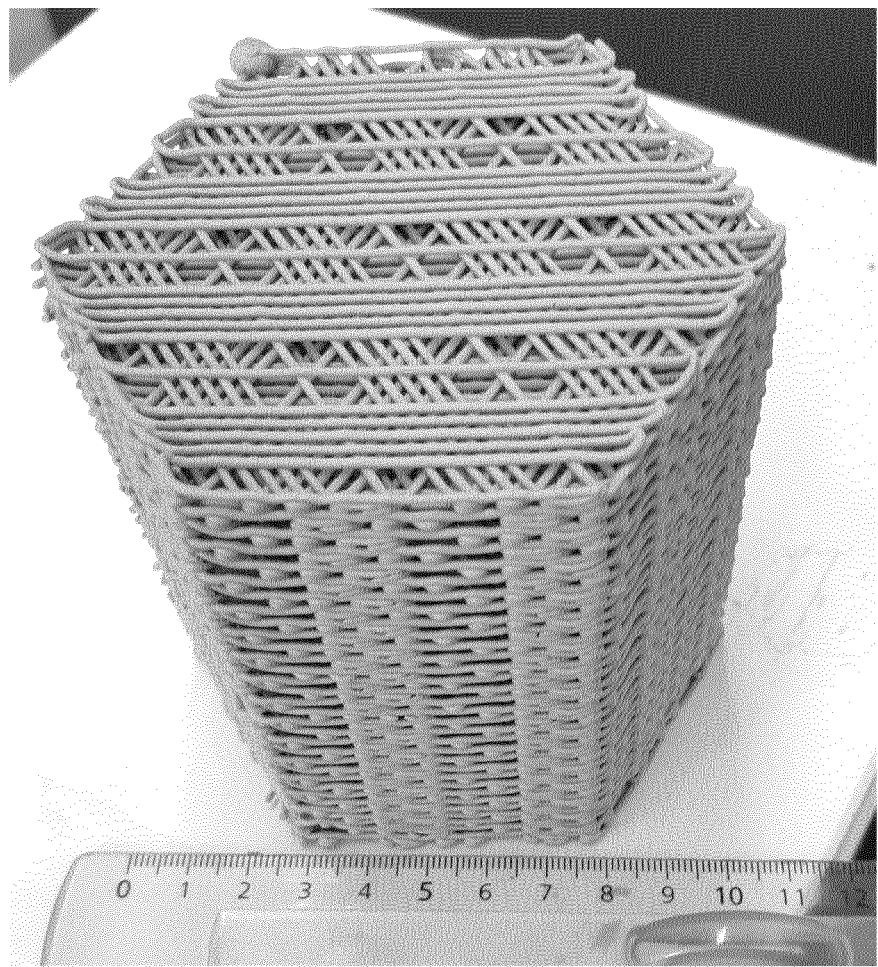

FIG. 24 shows a perspective view of an actual three dimensional structure according to the invention using the layer patterns shown in FIG. 20 and FIG. 22. The three dimensional structure is prepared by depositing 3 layers with a layer pattern of parallel spaced-apart strands as shown in FIG. 20 rotated at 60° and 120° to one another followed by the deposition of 3 layers with a layer pattern of parallel spaced-apart strands as shown in FIG. 22 rotated at 60° and 120° to one another, whereby this method of layer deposition is repeated over the course of the structure. The strand diameter b=1.2 mm, the primary distance between the parallel spaced apart strands within the groups of spaced apart strands m1=1.5 mm and the secondary distance between the groups of parallel spaced apart strands and the single strands m2=5.5 mm.

Figure 25:
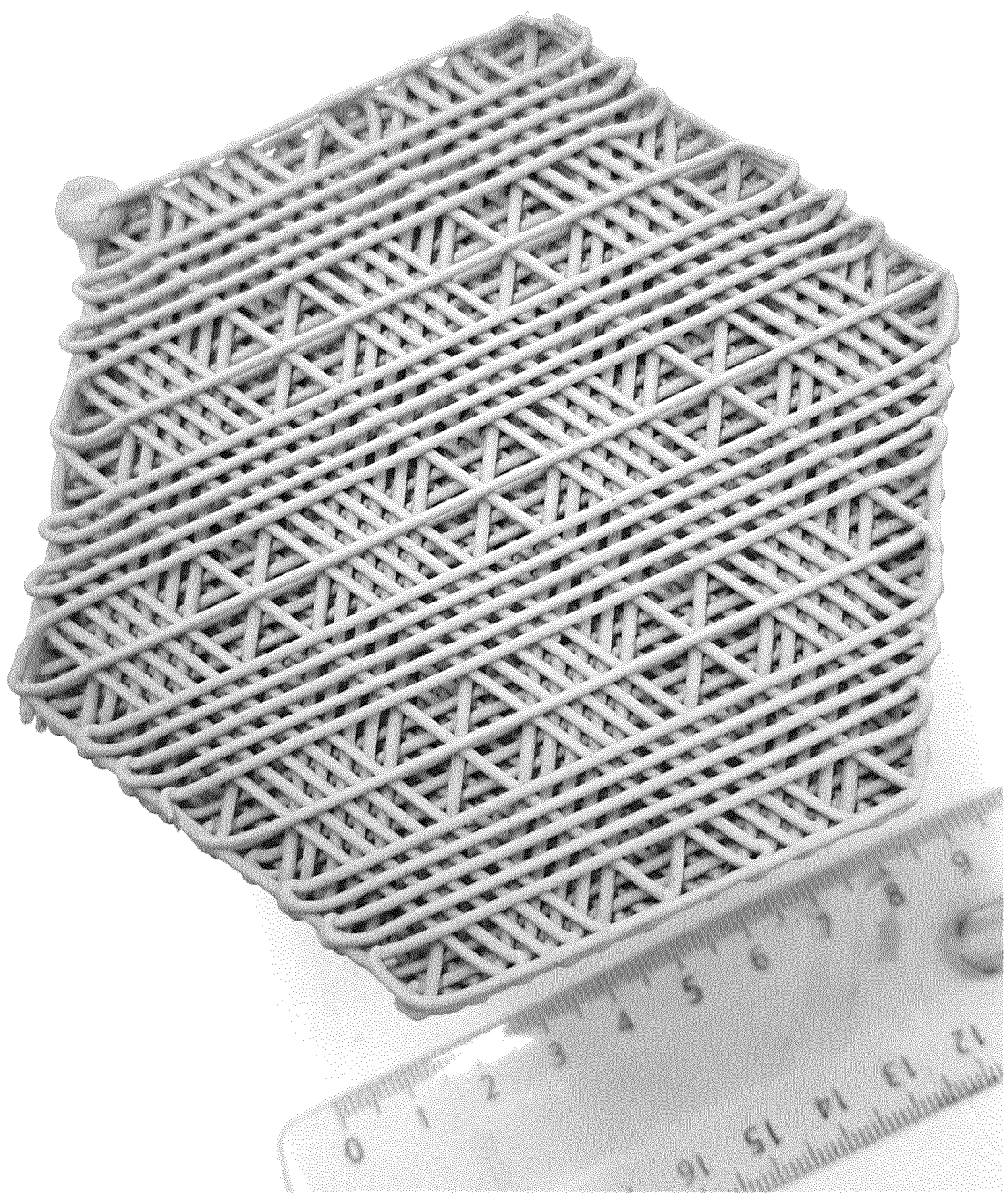

FIG. 25 shows a top view of the three dimensional structure shown in FIG. 24.

Figure 26:
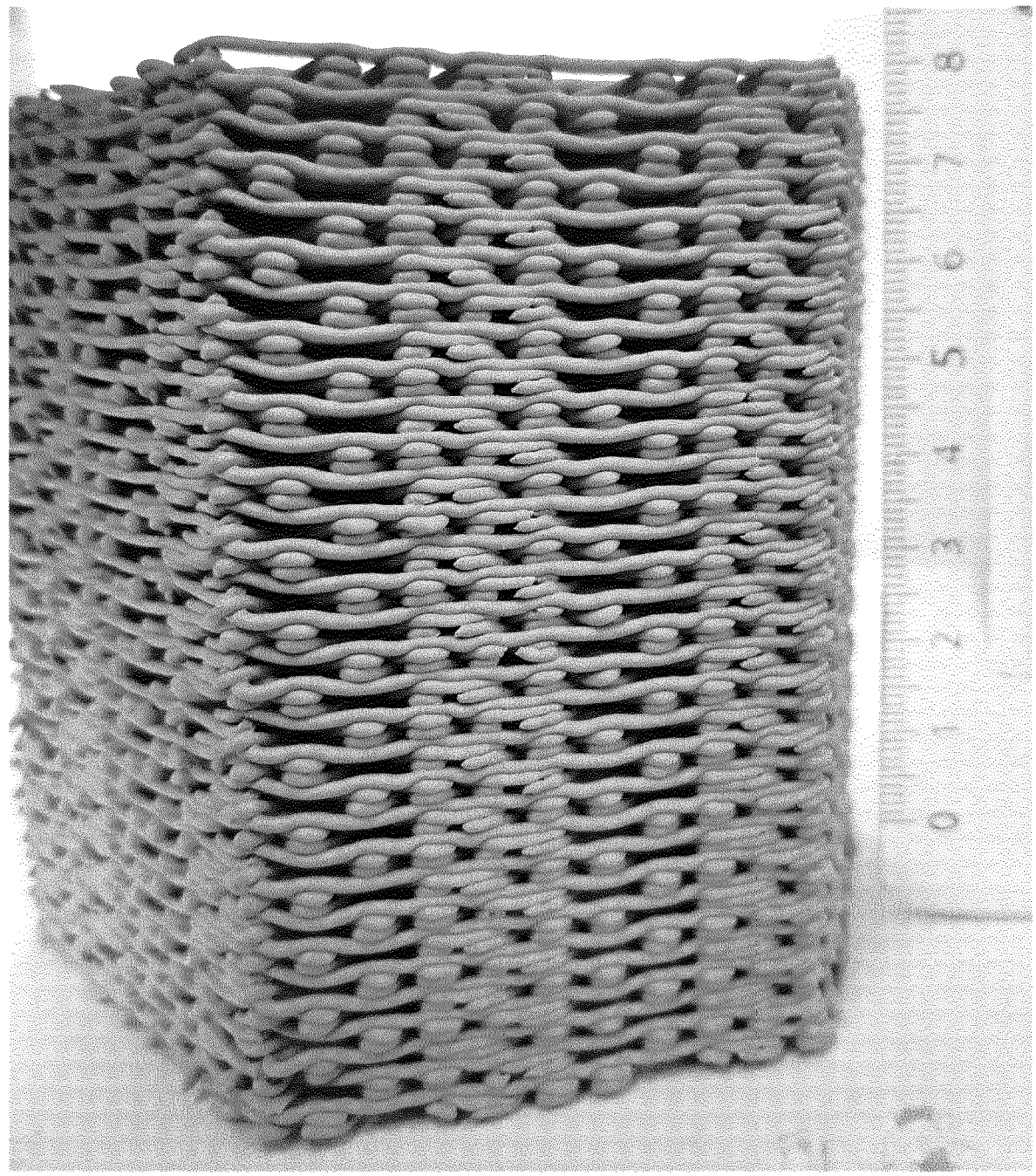

FIG. 26 shows a perspective view of the three dimensional structure shown in FIG. 24.

Figure 27A:
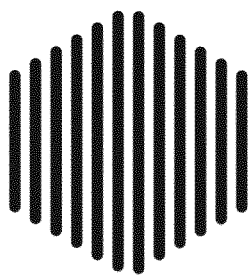

FIG. 27a shows a state of the art microextruded three dimensional structure layer.

Figure 27B:
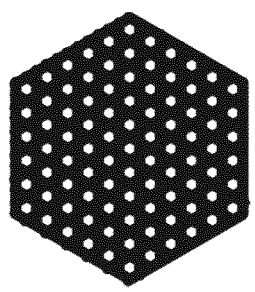
Figure 28:
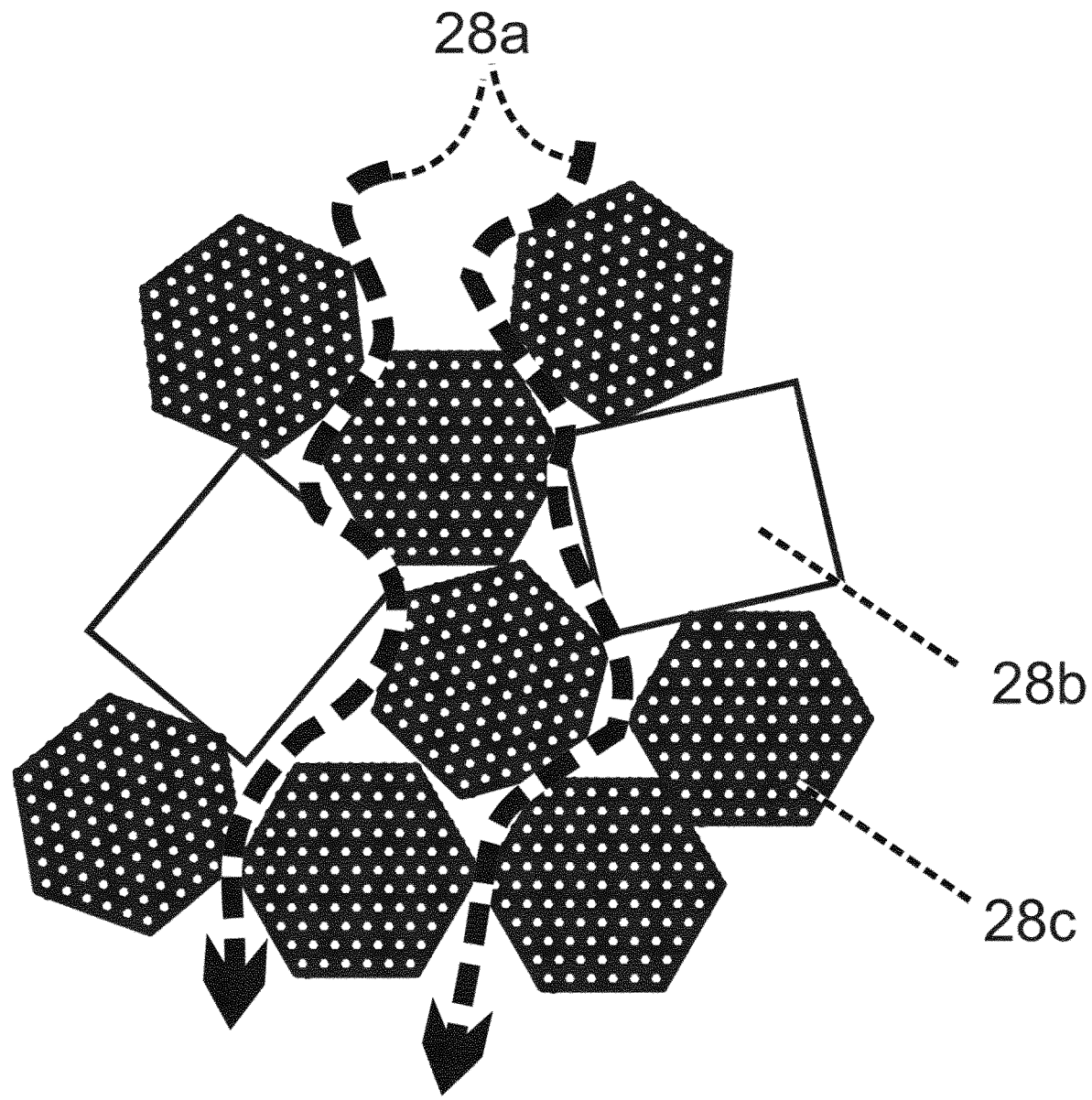

FIG. 27b shows the top view of a state of the art microextruded three dimensional structure. FIG. 28 shows the potential flow pattern of a gas flow across a packed bed of non-inventive catalyst structures inside a reactor. The illustration shows the gas flow (28a) bypassing the center of the robocasted three dimensional structures (28b) and (28c). In this case the increased surface area of the catalyst three dimensional structures is not fully utilized due to channeling of the gas flow around the three dimensional structure.

Figure 29:
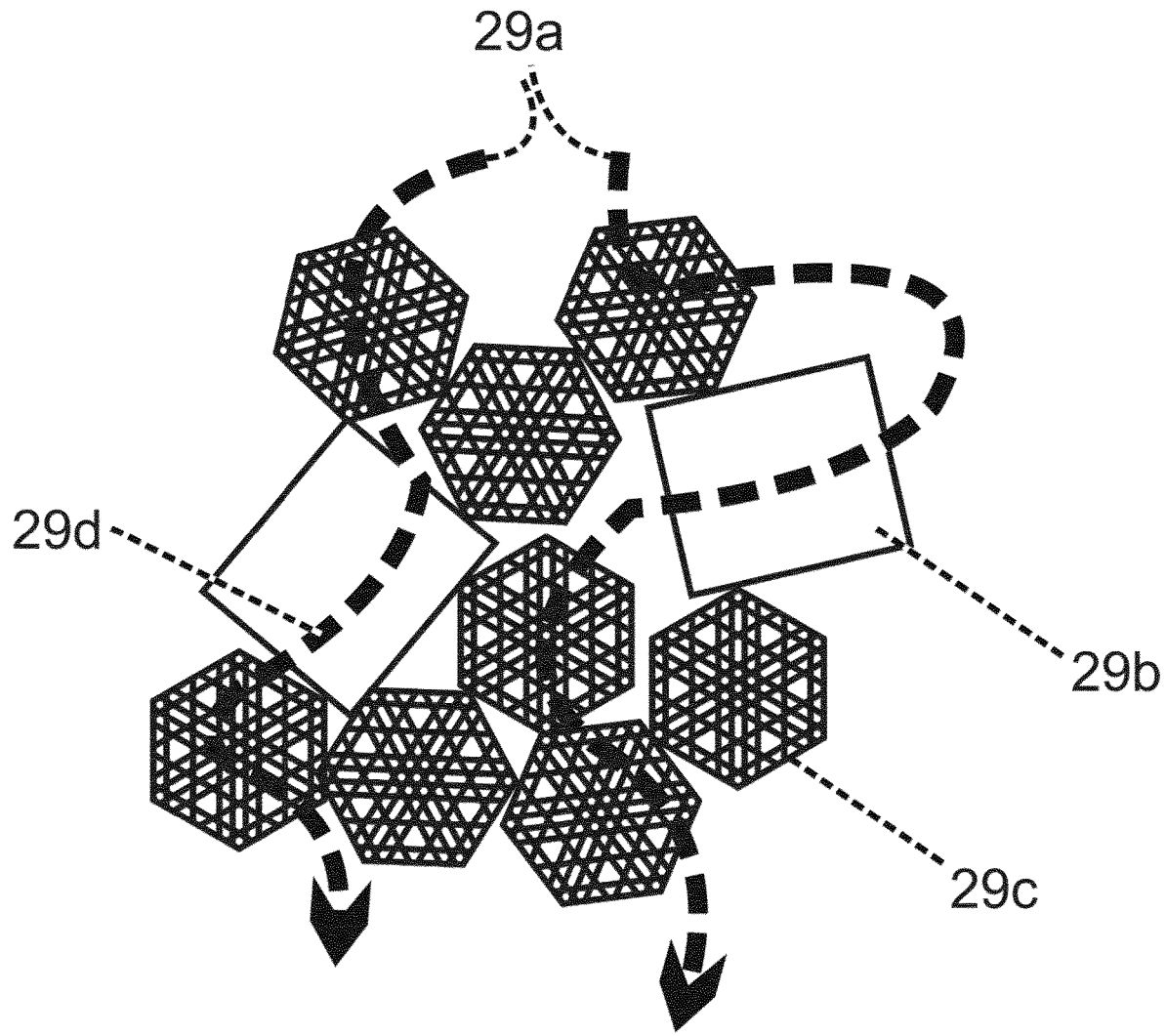

FIG. 29 shows the flow pattern of a gas flow across a packed catalyst bed of inventive catalyst structures according to FIGS. 7-10 inside a reactor. The illustration shows the gas flow (29a) entering the center of the printed structures (29b) and (29c). (31d) denotes the flow passing through the larger channels of one of the hexagonal three dimensional structures. In this case the increased surface area is accessible to the gas flow due to a low pressure drop across each individual three dimensional structure.

Figure 30:
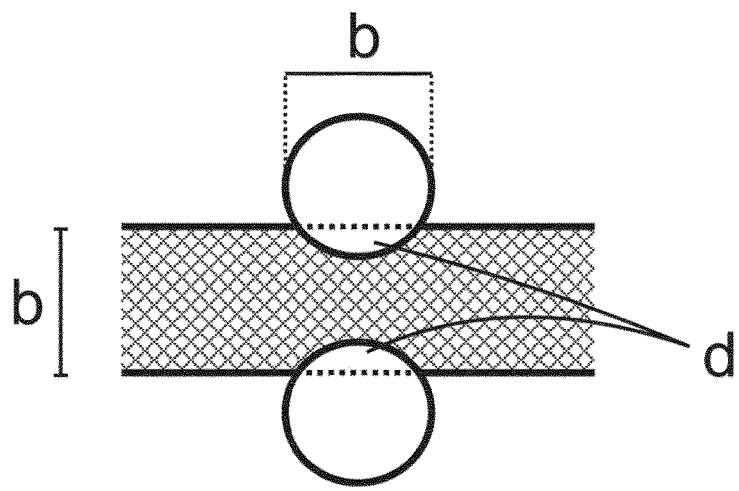

FIG. 30 illustrates the vertical overlap between 3 layers of a microextruded three dimensional structure. (b) is the fiber diameter, (d) the vertical overlap between the layers as given in Example 1 and 2.

The object of the invention is further achieved by a method for producing a three-dimensional porous catalyst, catalyst carrier or absorbent structure of stacked strands, comprising catalyst, catalyst carrier or absorbent material, comprising the following steps:

a) preparing a paste of metal, metal alloy, metal compound particles of catalytically active metal or catalyst support particles in a liquid diluent, in which the metal, metal alloy or metal compound particles can be supported on or mixed with catalyst support particles, and which paste can optionally comprise a binder material,
b) extruding the paste of step a) through one or more nozzles having a diameter larger than 100 µm to form strands, and depositing the extruded strands in consecutive layers of linear, spaced-apart parallel strands having the same or a different orientation and being congruent or not congruent with one another, to form a three-dimensional porous precursor,
c) drying the porous three-dimensional porous precursor to remove the liquid diluent,
d) if necessary, reducing metal oxide(s) in the three-dimensional porous precursor to form the catalytically active metal or metal alloy, or additional heat treatment to produce a catalytically active material.

The layer pattern and layer organization of the three dimensional structures of the invention leads to a significant decrease in pressure drop across each individual three dimensional structure. This results in a lower pressure drop across a reactor filled with the three dimensional structures of the invention and a more homogeneous flow through the reactor bed filled with a random packing of individual three dimensional structures.

In this respect, a three-dimensional structure is a one-piece made of at least two stacked layers of strands.

In general, the strands are deposited orthogonal or oblique to each other in alternating layers. The orientation of the strands in each consecutive layer can be rotated by a certain angle, e.g. by 60°, 45° or 36°, clockwise or anti-clockwise, with respect to the preceding layer. Channels are formed in the three dimensional structure by superposition of individual layers of parallel strands having different orientations.

Preferably, the strands are deposited in consecutive layers comprising a multitude of first layers, second layers and third layers, respectively, wherein the strands in the first layers, in the second layers and in the third layers, respectively, have the same orientation, and wherein first, second and third layers are oriented at 0°, 60° and 120°, respectively, to one another. Preferably, the three-dimensional catalyst structure has a hexagonal cross-section in this case, but it may also have a circular cross section.

In a further embodiment, the strands are deposited in consecutive layers comprising first, second, third and fourth layers, wherein the strands in the first layers, in the second layers, in the third layers and in the fourth layers are oriented at 0°, 45°, 90° and 135°, respectively, to one another. Preferably, the three-dimensional porous catalyst structure has an octagonal cross-section in this case, but it may also have a circular cross section.

The three dimensional structure can have any other suitable cross-section, for example a triangular, square, pentagonal or circular cross-section. A triangular three-dimensional porous catalyst structure can have sequences of layers oriented at 0°, 60° and 120°, respectively, to one another. A pentagonal three dimensional structure may have a sequences of layers, oriented at 0°, 36°, 72°, 108° and 144°, respectively, to one another.

In one embodiment, the parallel strands in each layer are partial strands deposited in a continuous manner as part of one single individual strand, the one single individual strand having corners and changing its direction in the plane of the layer.

In preferred embodiments, the outer periphery of the three-dimensional porous catalyst structure is created by depositing in some or all of the layers, preferably in all of the layers, a strand that forms a frame of the layers defining the outer perimeter of the three dimensional structure. The outermost strands are thus part of the frame. The stacked frames of each layer result in a solid lateral wall of the three-dimensional porous catalyst structure.

In further preferred embodiments, in some or all of the layers a strand is arranged that forms a frame of the layer defining the outer periphery of the three-dimensional porous catalyst.

Formulations also used in standard extrusion processes are in principle suitable as pasty suspensions. It is a prerequisite that the particle size of the catalyst precursor material is sufficiently small for the microextrusion nozzle. The largest particles (d99 value) should preferably be at least five times smaller, in particular at least ten times smaller, than the nozzle diameter.

Suitable formulations exhibit the rheological properties necessary for microextrusion. The abovementioned literature describes in detail how suitable rheological properties may be established. If necessary, binders and viscosity-modifying additions such as starch or carboxymethyl-cellulose may be added to the formulations.

The microextrudable pasty suspension preferably contains water as liquid diluent but organic solvents may also be employed. The suspension may contain not only catalytically active compositions or precursor compounds for catalytically active compositions but also an inorganic support material or inert material. Examples of commonly used support or inert materials, which may also be catalytically active per se in certain reactions, are silicon dioxide, aluminum oxide, diatomaceous earth, titanium dioxide, zirconium dioxide, magnesium oxide, calcium oxide, hydrotalcite, spinels, perovskites, metal phosphates, metal silicates, zeolites, steatites, cordierites, carbides, boron nitrides, metal-organic frame works and mixtures thereof.

The process according to the invention may also be used to produce shaped bodies essentially comprising only a support material or an inert material. Such shaped bodies produced by the process according to the invention may then be converted into catalyst shaped bodies in further process steps, for example by impregnation or coating and optionally further thermal treatment steps.

Metal, metal alloy or metal oxide particles of catalytically active metals or metal alloys can be employed in a robocasting process, wherein no treatment or sintering step at temperatures above 1000° C. is necessary in order to obtain mechanically stable catalytically active structures.

When employing metals, metal alloys or metal oxides, supported on or mixed with inorganic oxide catalyst support particles, a high dispersion of the catalytically active metal or metal alloy can be achieved since no temperature treatment at temperatures above 1000° C. is necessary. Often, such temperature treatment leads to a lowering of the dispersion of the catalytically active metal or alloy.

Powders of prefabricated supported catalysts, with catalytically active metals being in oxide form, if appropriate, can be formed in a robocasting process without significantly changing their properties, e.g. active metal dispersion on the catalyst support. According to the above-mentioned known processes, supported catalysts were obtained at the end of the robocasting and sintering only.

The robocasting process allows for the manufacture of three-dimensional porous catalyst structures of stacked catalyst fibers, which have an increased external surface area in comparison to normal extrudates.

This leads to higher activity and selectivity due to increased external surface area in diffusion-limited reactions, like hydrogenation reactions, oxidation reactions, or dehydration reactions.

An example of a hydrogenation reaction is that of butanal to butanol or butyne diol hydrogenation.

Furthermore, heat transport limited reactions like oxidation reactions, e.g. ethylene oxide reaction, can be envisaged.

A low pressure drop is possible, thus allowing to work with smaller fiber diameters compared to single extrudates.

The three-dimensional porous catalyst of stacked catalyst strands can be used in a randomly packed reactor bed or in a structured packing of a reactor.

The invention also relates to a randomly packed catalyst bed, comprising the three-dimensional porous catalyst of stacked catalyst strands of the invention.

The invention also relates to structured packing of a reactor, comprising the three-dimensional porous catalyst of stacked catalyst strands of the invention.

When starting from powders of prefabricated catalysts, the original active metal (oxide) dispersion on the catalyst support can be maintained.

The 3D robocasting technique employed according to the present invention is well established and can be performed as described in U.S. Pat. Nos. 7,527,671, 6,027,326, 6,401,795, Catalysis Today 273 (2016), pages 234 to 243, or Journal of Catalysis 334 (2016), pages 110 to 115, or U.S. Pat. No. 6,993,406.

The 3D robocasting technique can be used with catalyst formulations which can be based on pastes that are currently used in standard extrusion techniques provided the particle size is small enough to pass the extrusion nozzle. The extrusion formulation or paste contains pre-formed catalytic materials, e.g. nickel precipitates, in which the nickel oxide particles are already present. If necessary, a binder can be added to the extrusion mixture.

The robocasting technique implies the extruding through one or more nozzles having a diameter of more than 0.2 mm, preferably more than 0.5 mm. Particularly preferably, the diameter of the nozzle should be in the range of from 0.75 mm to 2.5 mm, most preferably from 0.75 mm to 1.75 mm. The nozzle can have any desired cross-section, e.g. circular, elliptical, square, star-shaped, lobed. The maximum diameter is the largest diameter of a non-circular cross-section. One of the main criteria for microextruding is the use of an extrudable paste that has the correct rheological properties for the microextruding technique. The above-mentioned literature gives detailed advice as how to obtain the required rheological properties.

If necessary, in the process according to the present invention, a viscosity adjusting agent can be employed. Typical viscosity adjusting agents are celluloses like carboxymethyl cellulose. Preferably, no viscosity adjusting agent or polymer is employed.

All commercially employed inorganic oxide catalyst support particles may be employed according to the present invention. Preferably, the inorganic oxide catalyst support is selected from the group consisting of diatomaceous earth, silicon dioxide, aluminium oxide, titanium dioxide, zirconium dioxide, magnesium oxide, calcium oxide, mixed metal oxides, hydrotalcites, spinels, perovskites, metal phosphates, silicates, zeolites, steatite, cordierite, carbides, nitrides or mixtures or blends thereof.

In addition to the above mentioned commercially employed inorganic oxide catalyst support particles (or mixtures thereof), a catalytically active material may be added as part of the inorganic oxide support (or mixtures thereof) or as an additional coating on the support structure or as several consecutive coatings. This catalytically active material may be composed of an number of the following elements: Na, K, Mg, Ca, Ba, Al, Si, Ti, V, Cr, Mn, Fe, Co, Ni, Cu, Zn, Y, Zr, Nb, Mo, Ru, Rh, Pd, Ag, Sn, Sb, La, Hf, W, Re, Ir, Pt, Au, Pb, and Ce, even if not all components are catalytically active.

The amount of catalytically active metal or metal alloy, which is based on the amount of support, is preferably in the range of from 0.1 to 95 wt.-%, more preferably 3 to 75 wt.-%, most preferably 8 to 65 wt.-%.

The suspension paste prepared in step a) of the process according to the present invention preferably has a solids content of 1 to 95 wt.-%, more preferably 10 to 65 wt.-%.

If necessary, a binder material for binding metal (oxide) and/or support particles together can be employed in the suspension paste. Preferred binder materials are selected from the group of norganic binders such as clays, alumina, silica or mixtures thereof.

The amount of binder material in the suspension paste is preferably in the range of from 0.1 to 80 wt.-%, more preferably 1 to 15 wt.-%, based on the suspension paste.

Often, it is not necessary to additionally use organic binder materials in the suspension although their use is possible according to the invention. Therefore, preferably no organic binder material is present in the suspension.

The term "porous" employed here defines that the three dimensional structure is not a solid block of material but contains channels and/or pores.

The porosity is preferably at least 20%, more preferably at least 30% can preferably be in the range of from 20 to 90%, and can be determined by Hg-PV and He-density. It can be determined by the following formula. Porosity (%)=100−[(density of total microextruded structure/density of fiber material)×100]. The density of the total microextruded structure is determined by dividing its total weight by its total volume. The density of the fiber material can be determined by measuring Hg-PV and He-density.

Since the lattices or scaffolds formed from the fibers are self-supporting, open space remains between the fibers which leads to the porosity. Respective structures can be seen in the above-mentioned literature.

The robocasting process employed according to the present invention can also be described as 3D fiber deposition.

General description of micro-extrusion also referred to as 3DFD 3D Fiber Deposition (3DFD) is used to shape powder of a catalyst, catalyst carrier or absorbent material. The 3DFD method is an adaptive manufacturing method whereby a highly loaded paste is extruded by a moving nozzle. By computer controlling the movement of the extrusion head in x, y and z-direction, a porous material can be produced from the extruded fibers or strands layer by layer. After drying, the porous material can be thermally dried.

The main benefit of this technology is the degree of freedom with regard to the porous parameters (fiber thickness, inter strand distance and stacking design).

The typical flow chart for the 3DFD technology consists of the following subsequent steps:

Prepare highly viscous paste

Extrude through thin nozzle

Computer controlled deposition of fibers to form a porous periodic structure

Drying and if necessary reducing

The powder is mixed together with the solvent/diluent (e.g. water), if necessary binder and additives, thus obtaining a viscous paste. A good mixing to achieve a homogeneous paste (minimizing agglomerates or the incorporation of air bubbles) is a prerequisite for a smooth and reproducible process. The powder loading of the functional material depends on the specific surface area, the particle size distribution and the powder morphology. Generally, as the particle size of the powder decreases, the viscosity of the paste will increase. Therefore the solid loading needs to be lowered for these powders. Apart from organic or, preferably, inorganic binder(s), rheology modifiers can be added to control the rheological behavior of the paste. In some cases a defoamer is also added to avoid air bubbles in the paste.

After drying at room conditions (or under controlled atmosphere and temperature), the 3DFD structure is reduced, if necessary. No calcining or sintering at temperatures above 1000° C. is necessary.

The three dimensional structure of stacked fibers may shrink due to the heat treatment. This shrinkage could be in the range of 5-50% of the printing size of the "green" catalyst body.

The three dimensional structure of stacked catalyst fibers is three-dimensionally structured by depositing the extruded fibers in regular, recurring stacking pattern (periodically structured catalyst), to form a three-dimensionally structured porous catalyst precursor.

The points where the direction of the extrudate is changed or the layer in which the extrudate is deposited may have a larger diameter than the desired strand diameter. Though undesired, the diameter of an individual strand may also change in a parallel section of the shaped body due to a change in the printing speed.

The fibers or strands preferably have a thickness of 0.2 mm to 2.5 mm, more preferably of 0.5 mm to 2 mm, most preferably 0.75 mm to 1.75 mm.

They are preferably spatially separated from each other by a smaller first (primary) and one larger second (secondary) distance, wherein the first distance is determined by the formula:

$$m_1 = b \cdot d$$

wherein ($m_1$), the primary distance between the fibers is determined by the strand diameter b multiplied by a factor d, wherein d is from 0.25 to 2, more preferably from 1 to 2. The larger secondary distances are calculated by the formula:

$$m_2 = m_1 \cdot e$$

wherein $m_2$ is at least one of the secondary inter-strand distances, e is from 2 to 10, preferably 2 to 6.

Furthermore, (x) number of spacings may be present in the three dimensional structure as described by the formula:

$$m_x = m_1 \cdot e$$

wherein $m_x$ is at least one of the subsequent inter-strand distances, e is from 2 to 10, preferably 2 to 6.

The invention is further illustrated by the following examples.

Pressure Drop Simulations

EXAMPLES 1 TO 3

The correlation between pressure drop and catalyst three dimensional structure shape was calculated via numerical flow simulation (computational fluid dynamics—CFD), which completely resolves the flow in the void spaces between the solid catalyst structures. CFD simulations are a standard tool to calculate the pressure drop in complex 3D geometries. First, the geometry of the 3D micro-extruded (robocasted) catalyst three dimensional structure is created. For this purpose, a CAD (Computer Aided Design) model of a single catalyst body is created with a CAD program. For the calculation of the internal pressure drop the porous three dimensional structures were virtually placed in tubes with the exact same cross-section, to exclude bypass flow around the three dimensional structures. Pressure drop calculations were performed by simulating air flow at ambient temperature and different gas space velocities (GHSV, gas hourly space velocity). Values for the thermodynamic and transport properties of air at a constant operating pressure of 1 bar and a temperature of 20° C. were taken from the scientific literature.

EXAMPLE 1

Current State of the Art Additive Manufactured

| strand diameter | b | m (meter) | 0.001 |
|---|---|---|---|
| inter strand distance | $m_1$ | m | 0.001 |
| vertical overlap | d | m | 0.0001 |
| strands per layer | | | 24 |
| number of layers | | | 24 |
| packing height | | m | 0.0217 |
| Porosity | E | — | 0.599 |
| area per volume | A/V | $m^2/m^3$ | 1477 |

EXAMPLE 2

Inventive Additive Manufactured Monolith Structure

| strand diameter | b | m | 0.001 |
|---|---|---|---|
| Primary inter-strand distance | $m_1$ | m | 0.001 |
| Seconday inter-strand distance | $m_2$ | m | 0.003 |
| Overlap | d | m | 0.0001 |
| strands per Layer | | | 16 |
| number of layers | | | 18 |
| packing height | | m | 0.0163 |
| Porosity | E | — | 0.736 |
| area per volume | A/V | $m^2/m^3$ | 1000 |

EXAMPLE 3

Comparison of Pressure-Drop Between Example 1 and Example 2

| Empty Pipe Velocity | Pressure drop $\Delta p$ (Pa/m) | |
|---|---|---|
| m/s | Example 1 | Example 2 |
| 0.25 | 339.3 | 136.3 |
| 0.5 | 875.2 | 378.4 |
| 1 | 2390.6 | 1092.9 |
| 2 | 6846.8 | 3200.6 |
| 4 | 19652.1 | 9502.3 |

The invention claimed is:

1. A three-dimensional porous catalyst, catalyst carrier or absorbent structure comprising stacked strands of catalyst, catalyst carrier or absorbent material, composed of adjacent layers of spaced-apart parallel strands, wherein parallel strands within a layer are arranged in groups of two or more closely spaced-apart, equidistant strands separated by a first distance, wherein the groups of equidistant strands are separated from adjacent strands or adjacent groups of strands by a second distance larger than the first distance.

2. The three-dimensional structure of claim 1, wherein adjacent layers have the same pattern of parallel strands and are oriented at an angle to one another.

3. The three-dimensional structure of claim 1 having a hexagonal cross-section composed of at least three layers of parallel strands that are oriented at 0°, 60° and 120°, respectively, to one another.

4. The three-dimensional structure of claim 3, wherein every third layer has a same orientation.

5. The three-dimensional structure of claim 1 having an octagonal cross-section composed of at least four layers of parallel strands that are oriented at 0°, 45° and 90 and 135°, respectively, to one another.

6. The three-dimensional structure of claim 5, wherein every fourth layer has a same orientation.

7. The three-dimensional structure of claim 1, comprising sections each composed of layers of spaced-apart parallel strands, wherein the pattern of the spaced-apart parallel strands within layers of one section are different from the pattern of spaced-apart parallel strands within layers of another section.

8. The three-dimensional structure of claim 7, wherein each section comprises 3 or 4 layers of the same pattern oriented at an angle to one another.

9. The three-dimensional structure of claim 1, comprising adjacent layers having different patterns of parallel strands.

10. The three-dimensional structure of claim 1, wherein the thickness of the parallel strands varies in adjacent layers.

11. The three-dimensional structure of claim 1, wherein the larger distance is 2 to 10 times the small distance.

12. The three-dimensional structure of claim 1, wherein the groups of equidistant parallel strands are composed of 2, 3 or 4 to 6 parallel strands.

13. The three-dimensional structure of claim 1, wherein in a layer single strands are arranged between two groups of equidistant parallel strands.

14. The three-dimensional structure of claim 1, wherein the small distance is from 0.5 to 2 mm and the larger distance is 2 to 10 mm.

15. A method for producing a three-dimensional porous catalyst, catalyst carrier or absorbent structure as claimed in claim 1, comprising the following steps:
   a) Preparing a paste of metal, metal alloy, metal compound particles of catalytically active metal or inorganic oxide catalyst support particles in a liquid diluent, in which the metal, metal alloy or metal compound particles can be supported on or mixed with inorganic oxide catalyst support particles, and which paste comprises a binder material,
   b) extruding the paste of step a) through one or more nozzles having a diameter larger than 100 µm to form strands, and depositing the extruded strands in consecutive layers of linear, spaced-apart parallel strands having the same or a different orientation and being congruent or not congruent with one another, to form a three-dimensional porous precursor,
   c) drying the porous three dimensional precursor to remove the liquid diluent,
   d) if necessary, reducing metal oxide(s) in the porous precursor to form the catalytically active metal or metal alloy, or conducting an additional heat treatment to produce a catalytically active material.

16. The method according to claim 15, wherein parallel strands are deposited continuously as partial strands of one single individual strand in each layer.

17. The method according to claim 15, wherein the inorganic oxide catalyst support is selected from the group consisting of silicon dioxide, aluminium oxide, titanium dioxide, zirconium dioxide, magnesium oxide, calcium oxide, mixed metal oxides, hydrotalcites, spinels, perovskites, metal phosphates, silicates, zeolites, steatite, cordierite, carbides, nitrides and mixtures or blends thereof.

18. The method according to claim 15, wherein the catalytically active metal is selected from the group consisting of Na, K, Mg, Ca, Ba, Al, Si, Ti, V, Cr, Mn, Fe, Co, Ni, Cu, Zn, Y, Zr, Nb, Mo, Ru, Rh, Pd, Ag, Sn, Sb, La, Hf, W, Re, Ir, Pt, Au, Pb, and Ce and mixtures or alloys thereof.

19. The method according to claim 15, wherein a binder material is employed, selected from the group consisting of clays, alumina, silica and mixtures thereof.

20. A method of carrying out an oxidation, hydrogenation and dehydration reaction, comprising the step of bringing the reactants in contact with the three-dimensional porous catalyst structure of stacked catalyst strands according to claim 1.

* * * * *